UNITED STATES PATENT OFFICE.

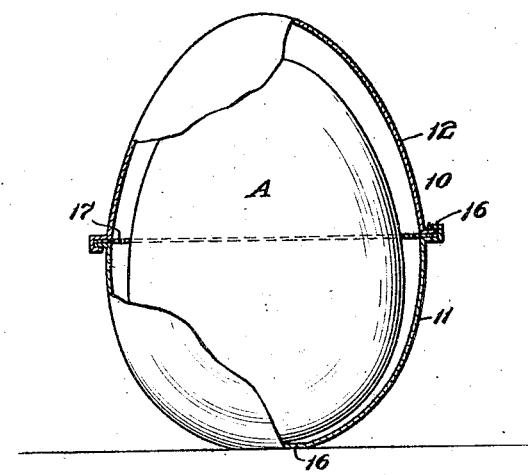
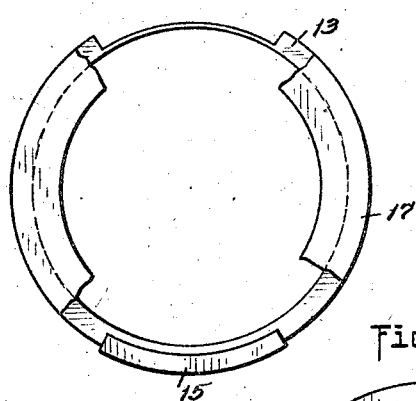
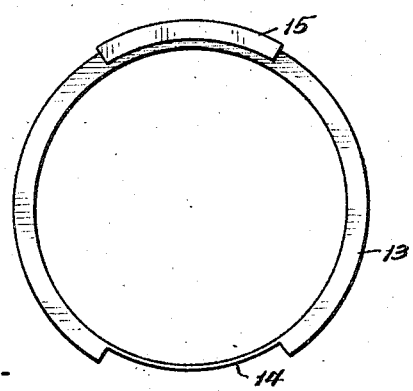
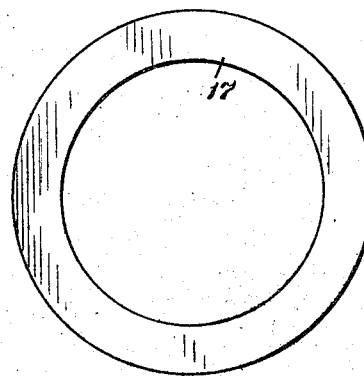

FREDERICK HOSTETTER, OF BROOKLYN, NEW YORK, ASSIGNOR OF ONE-HALF TO GUSTAF PETTERSON, OF BROOKLYN, NEW YORK.

EGG PROTECTOR.

1,419,905.

Specification of Letters Patent. Patented June 13, 1922.

Application filed December 14, 1921. Serial No. 522,219.

*To all whom it may concern:*

Be it known that I, FREDERICK HOSTETTER, a citizen of the United States, and resident of New York city, borough of Brooklyn, in the county of Kings and State of New York, have invented certain new and useful Improvements in Egg Protectors, of which the following is a specification.

The invention relates to an egg protector of the type in which a single egg is enclosed within a containing shell, and the invention contemplates an improvement in similar devices of the character in which the protecting shell is formed in two parts demountably secured together.

One of the objects of the invention is to provide a simplified form of connection which can be cheaply constructed and easily used, especially in connection with ease of assembling the two parts into the complete container.

Still another object of the invention is to provide a protector of the type outlined in which one of the parts or halves may be utilized as a means for supporting an egg in position to be eaten from the shell.

Still another object of the invention is to provide an egg protector which will house different sized eggs in a hermetically sealed container and free from shaking.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view of a side elevation showing a preferred embodiment of the invention and with parts broken away to show the contained egg.

Figure 2 is a plan view looking down upon the lower part of the shell shown in Figure 1 and with parts of the gasket broken away.

Figure 3 is a similar view of the corresponding part of the upper half of the shell, and, Figure 4 is a plan view of the gasket.

In the drawing there is shown a two part hollow shell which comprises a lower substantially semi-spherical part 11, and a complementary upper part 12, co-acting when assembled as shown in Figure 1, to form a hollow egg-shape container designed to contain an egg A.

The contacting edges of these two parts are each provided with an outwardly extending annular flange 13 interrupted, as shown at 14, to permit the entrance of a groove forming portion 15 on the opposite flange. This grooved formed portion has a circumferential length slightly less than the corresponding length of the recess 14, and is formed by bending a projecting portion of the flange back upon itself to form the groove 16.

One of the parts, such for instance as the part 11, is provided with a flat bottom 16 which provides a support for holding the egg in an upright position either when housed in the assembly container or when served in the lower part and with the upper part of the egg exposed for eating. A ring gasket 17, preferably of fibre such as paper, is interposed between the flanges of the two parts and assists in maintaining an airtight joint between the parts of the container.

By means of a device of this character, it is possible to mount eggs individually and by simply breaking away the inner portion of the gasket any size egg may be fitted within the opening in the gasket. In this way, any size egg is held from shaking.

When enclosed in the device disclosed the egg is hermetically sealed and can be maintained out of contact of air for any desired period of time.

In operation, it will be readily understood that when the egg has been mounted in position in one of the parts of the container the gasket can be forced into place and the parts can be fastened together by a rotary movement to thus form a bayonet joint connection between the parts.

The flanges act as reinforcements to the shell preventing a collapsing of the shell halves when made of frail material. The two parts are so designed that a number of the parts can be stacked in telescoped relation one within the other.

Having thus described my invention, what I claim is:

1. An egg protector including a two part hollow shell with the parts coacting to provide an egg-shape container, the meeting edges of each of said parts provided with an outturned annular flange and each flange being interrupted for a portion of its circumference to receive the uninterrupted part of the other flange and the uninterrupted part of each flange being bent back upon itself to provide a groove for receiving a part of the flange on the other part and thus form a bayonet joint connection between the parts of the shell.

2. An egg protector including a two part hollow shell with the parts coacting to provide an egg-shape container, the meeting edges of each of said parts provided with an outturned annular flange and each flange being interrupted for a portion of its circumference to receive the uninterrupted part of the other flange and the uninterrupted part of each flange being bent back upon itself to provide a groove for receiving the part of the other part, and thus form a bayonet joint connection between the parts of the shell, one of said parts having a flat bottom whereby said part can be used as an egg holder with part of the egg exposed.

3. An egg protector including a two part hollow shell with the parts coacting to provide an egg-shape container, the meeting edges of each of said parts provided with an outturned annular flange and each flange being interrupted for a portion of its circumference to receive the uninterrupted part of the other flange and the uninterrupted part of each flange being bent back upon itself to provide a groove for receiving a part of the flange on the other part and thus form a bayonet joint connection between the parts of the shell, and a gasket fitted between the parts and engaged on opposite sides by the flange.

Signed at New York in the county of New York and State of New York this 6th day of December, 1921.

FREDERICK HOSTETTER.